United States Patent
Yu et al.

(10) Patent No.: US 9,273,619 B2
(45) Date of Patent: Mar. 1, 2016

(54) SUPERCHARGED ENGINE AND METHOD OF CONTROL

(71) Applicants: Songping Yu, Troy, MI (US); Anwar Alkeilani, Auburn Hills, MI (US)

(72) Inventors: Songping Yu, Troy, MI (US); Anwar Alkeilani, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 504 days.

(21) Appl. No.: 13/709,903

(22) Filed: Dec. 10, 2012

(65) Prior Publication Data

US 2014/0158097 A1    Jun. 12, 2014

(51) Int. Cl.
| | |
|---|---|
| F02B 33/44 | (2006.01) |
| F02B 33/00 | (2006.01) |
| F02D 41/00 | (2006.01) |
| F02D 23/00 | (2006.01) |
| F02B 37/12 | (2006.01) |

(52) U.S. Cl.
CPC .......... *F02D 41/0007* (2013.01); *F02B 37/127* (2013.01); *F02D 23/00* (2013.01); *F02D 2200/0402* (2013.01); *F02D 2200/0406* (2013.01); *F02D 2200/0411* (2013.01); *F02D 2200/0414* (2013.01); *Y02T 10/144* (2013.01)

(58) Field of Classification Search
CPC ................ F02D 41/0007; F02D 23/00; F02D 2200/0402; F02D 2200/0406; F02D 2200/0414; F02D 2200/0411; Y02T 10/144; F02B 37/127
See application file for complete search history.

(56) References Cited

U.S. PATENT DOCUMENTS

| | | | | |
|---|---|---|---|---|
| 4,565,178 | A | * | 1/1986 | Nagase et al. ................. 123/564 |
| 5,119,795 | A | * | 6/1992 | Goto et al. ..................... 123/563 |
| 5,150,693 | A | * | 9/1992 | Ohnaka et al. ............. 123/559.3 |
| 5,207,206 | A | * | 5/1993 | Takahashi et al. ............ 123/564 |
| 7,353,699 | B2 | * | 4/2008 | Rollinger et al. ........... 73/114.39 |
| 2007/0051349 | A1 | * | 3/2007 | Marumoto et al. ........... 123/565 |
| 2007/0131206 | A1 | * | 6/2007 | Rollinger et al. .......... 123/559.1 |
| 2008/0066723 | A1 | * | 3/2008 | Eiraku ........................... 123/564 |
| 2009/0107455 | A1 | * | 4/2009 | Pallett et al. .................. 123/299 |
| 2011/0067678 | A1 | * | 3/2011 | Burkhardt et al. ......... 123/559.1 |
| 2011/0138807 | A1 | * | 6/2011 | Ulrey et al. .................. 60/605.1 |
| 2012/0060492 | A1 | * | 3/2012 | Pursifull et al. ................ 60/602 |
| 2013/0232971 | A1 | * | 9/2013 | Miazgowicz et al. .......... 60/602 |
| 2013/0333665 | A1 | * | 12/2013 | Pursifull ....................... 123/399 |

* cited by examiner

*Primary Examiner* — Thai Ba Trieu
*Assistant Examiner* — Paolo Isada
(74) *Attorney, Agent, or Firm* — Ralph E. Smith

(57) ABSTRACT

Methods and systems for minimizing the power consumed by a supercharger pump in an engine system. The methods and systems minimize the delta pressure across the pump with a control strategy for positioning the electronic throttle and supercharger bypass valve in a coordinated manner to deliver the required amount of fresh air flow into engine (i.e., the air flow associated with the driver's requested torque), while, at the same time, minimizing the power consumed by the supercharger pump for best fuel economy.

12 Claims, 3 Drawing Sheets

SUPERCHARGED ENGINE AND METHOD OF CONTROL

FIELD

The present disclosure relates generally to vehicles having a supercharged engine and, more particularly, to a method and system for controlling an electronic throttle and a supercharger bypass valve to maximize fuel economy in supercharged vehicles.

BACKGROUND

A supercharger (also known as a blower, positive displacement pump or a centrifugal pumper) can be used to increase engine output power by forcing a relatively high volume of air into the engine's cylinders. The additional mass of oxygen that is forced into the cylinders allows the engine to burn more fuel, which improves the volumetric efficiency of the engine and makes it more powerful.

A supercharger is often mechanically linked to and powered by the engine's crankshaft. This means that the supercharger's pump is driven by the engine and uses engine power to function, which could impact the vehicle's fuel economy. Accordingly, there is a need for improvement in the art.

SUMMARY

In one form, the present disclosure provides a method of controlling an engine system, the system comprising a throttle, a supercharger pump and a supercharger bypass valve connected between an intake manifold and the throttle. The method comprises determining, by a processor, a desired manifold pressure; setting one of the throttle or the bypass valve to a predetermined position based on the desired manifold pressure and at least one operating parameter of the system; and controlling the other of the throttle or the bypass valve to minimize pressure across the supercharger pump.

The present disclosure also provides an engine system comprising a throttle connected to an intake manifold connected to the engine; a supercharger pump and a supercharger bypass valve connected between the intake manifold and the throttle; and a controller connected to the throttle and the bypass valve. The controller is adapted to determine determining a desired manifold pressure; set one of the throttle or the bypass valve to a predetermined position based on the desired manifold pressure and at least one operating parameter of the system; and control the other of the throttle or the bypass valve to minimize pressure across the supercharger pump.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

The inventors have determined that an effective way to minimize the power consumed by the supercharger's pump is to minimize the delta pressure across the pump. As such, the disclosed system and methods implement a control strategy for positioning the electronic throttle and supercharger bypass valve in a coordinated manner to deliver the required amount of fresh air flow into engine (i.e., the air flow associated with the driver's requested torque), while, at the same time, minimizing the power consumed by the supercharger pump for best fuel economy.

Figure 1:
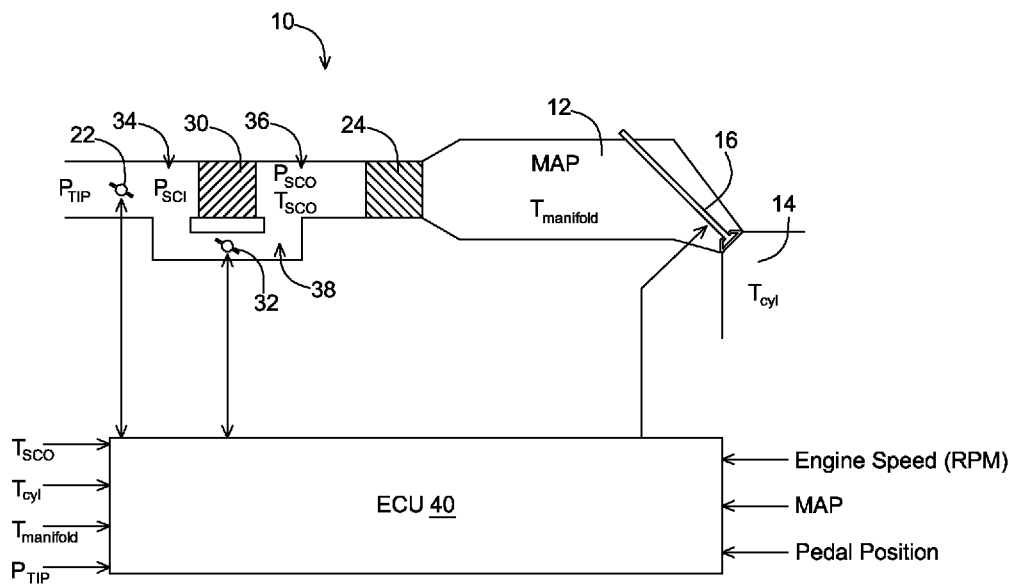
FIG. 1 illustrates an example supercharger engine system according to an embodiment disclosed herein.

FIG. 1 illustrates an example supercharger engine system 10 according to an embodiment disclosed herein. The system 10 includes an electronic throttle 22, a supercharger 30 having a bypass valve 32 located downstream of the throttle 22, and an air cooler 24 connected between the supercharger 30 and an intake manifold 12. The system 10 includes a supercharger input region 34 upstream of the supercharger 30, a supercharger output region 36 downstream of the supercharger 30 and a bypass region 38 where the supercharger bypass valve 32 is provided. The intake manifold 12 is connected to one or more engine cylinders 14. It should be appreciated that the engine would have more than one cylinder 14 (e.g., 4, 6 or 8 cylinders) and that FIG. 1 only illustrates one cylinder for clarity purposes. Each cylinder 14 has an associated intake valve 14. It should be appreciated that necessary tubing/piping is only generally shown in FIG. 1.

An electronic control unit (ECU) 40 is connected to control the electronic throttle 22, supercharger 30 bypass valve 32 and engine intake valves 16. The ECU 40 could be a processor programmed to perform the methods 100, 200 discussed below and/or other necessary controller functions. The ECU 40 will receive the engine speed in revolutions per minute (RPM) from the engine or a sensor attached to the engine. The ECU 40 will also receive an accelerator position from e.g., a sensor attached to the accelerator pedal (not shown). The throttle 22 may output a throttle position or similar type of signal to the ECU 40, if desired. The bypass valve 32 may output a valve position or similar type of signal to the ECU 40, if desired.

The ECU 40 is programmed to input and use other signals and information that will be used in the methods 100, 200 described below. These signals include the air pressure $P_{TIP}$ at the input of the throttle 22, air temperature $T_{SCO}$ at the output of the supercharger 30 (i.e., in region 36), air temperature $T_{manifold}$ in the intake manifold 12, air temperature $T_{cyl}$ in the engine cylinders 14, and the manifold absolute pressure (MAP) of the intake manifold 12. FIG. 1 also shows the air pressure $P_{SCI}$ at the input of the supercharger 30 (i.e., region 34) and the air pressure $P_{SCO}$ at the output of the supercharger 30 (i.e., region 36).

As will become apparent from the following description, some of the inputs to the ECU 40 can be input from appropriate sensors positioned within the system 10 or they can be calculated/estimated based on other information within the system 10. As will be discussed below, the air pressure $P_{SCI}$ at the input of the supercharger 30 and the air pressure $P_{SCO}$ at the output of the supercharger 30 will be determined based on calculations; as such, in the FIG. 1 embodiment, they are not specifically shown as inputs to the ECU 40. It should be appreciated that FIG. 1 illustrates one example system 10 and the principles disclosed herein are not limited solely to the FIG. 1 illustrated configuration. That is, some of the signals that are shown as being input from sensors can be derived while some of the signals that are discussed as being derived can be input from sensors.

Figure 2:
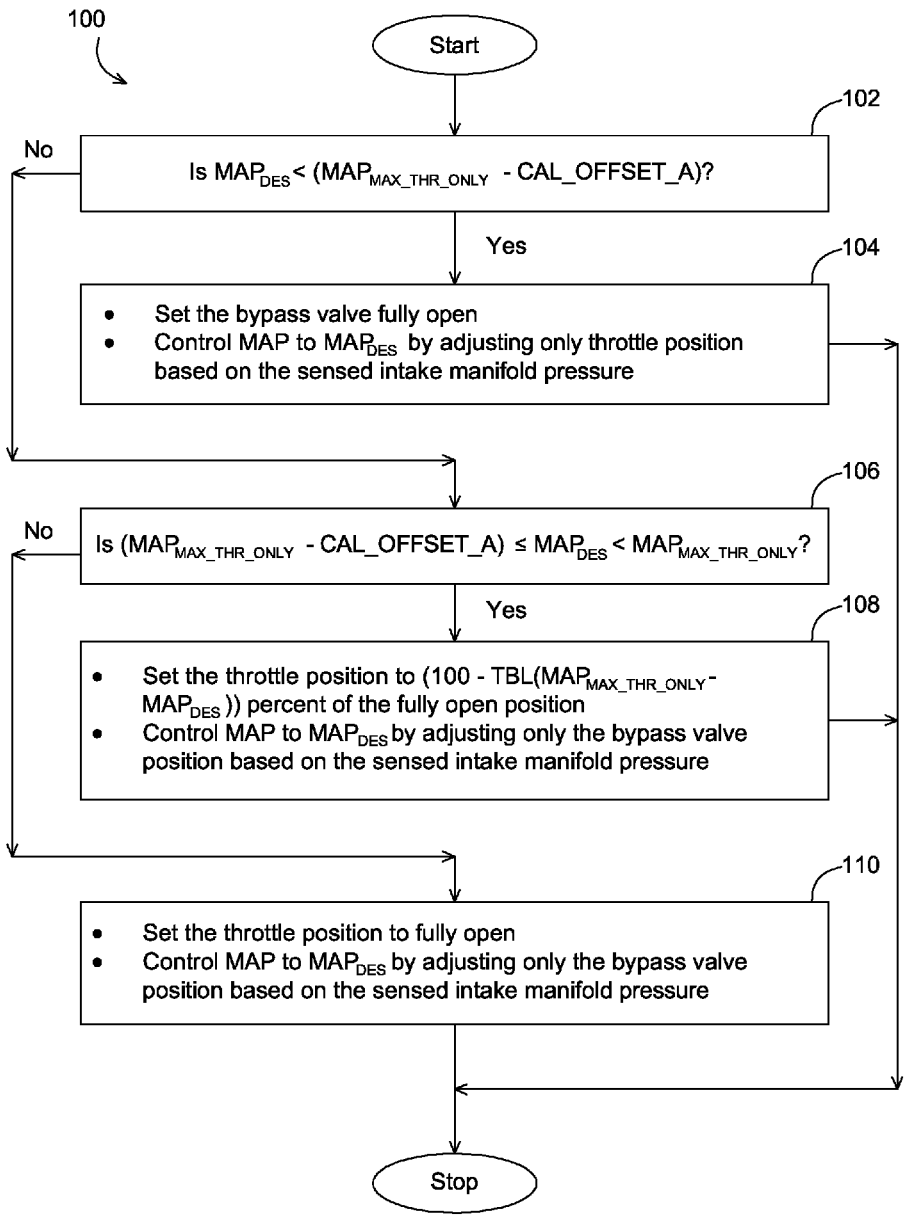
FIG. 2 illustrates a flowchart of an example method for controlling an electronic throttle and a supercharger bypass valve used in the FIG. 1 system.

FIG. 2 illustrates an example method 100 for controlling the electronic throttle 22 and a supercharger bypass valve 32 used in the FIG. 1 system 10. In a desired embodiment, the method 100 is implemented in software, stored in a computer readable medium, which could be a random access memory (RAM) device, non-volatile random access memory (NVRAM) device, or a read-only memory (ROM) device) and executed by the engine control unit 40, which may be or include a processor, or other suitable controller within the system 10 of FIG. 1. Moreover, the computer readable medium can be part of the ECU 40 or external to the ECU 40. The method 100 can be performed continuously or periodically as part of background or normal processing of the ECU 40.

Initially it is noted that the target amount of fresh air trapped in a cylinder for combustion directly correlates with the desired intake manifold pressure ($MAP_{des}$). Moreover, the desired intake manifold pressure $MAP_{des}$ is deterministic once the volumetric efficiency (VE) at given conditions is known and the requested engine torque is known. The desired intake manifold pressure $MAP_{des}$ can be determined as follows:

$$MAP_{des} = CYL\_CHARGE * R_{AIR} * T_{CYL} / (CYL\_VOL * VE) \quad (1)$$

Where CYL_CHARGE is the amount of fresh air in the cylinder, which is a reflection of the target engine torque; $T_{CYL}$ is the air temperature in the cylinder; and CYL_VOL is the cylinder's volume. The engine volumetric efficiency is normally determined through engine mapping process and the target engine torque depends on the pedal position and pedal mapping calibration.

For a given MAP target, the inventors have determined that there are multiple methods of controlling the electronic throttle 22 and supercharger bypass valve 32 to deliver the same objective of delivering the required torque and maximizing fuel economy. Method 100 is a closed loop control mechanism for coordinating the control of electric throttle 22 and supercharger bypass valve 32, while method 200, discussed below, is an open loop control mechanism.

Referring to FIG. 2, at step 102, the desired intake manifold pressure $MAP_{des}$ is determined using equation (1) and then compared with the maximum achievable intake manifold pressure with a fully opened bypass valve ($MAP_{MAX\_THR\_ONLY}$) minus a calibration offset (CAL_Offset_A). In this embodiment, $MAP_{MAX\_THR\_ONLY}$ can be determined as follows.

$$MAP_{MAX\_THR\_ONLY} = P_{TIP} - TBL(RPM). \quad (2)$$

Where the table of parameters TBL(RPM) represents inlet pressure loss with fully opened throttle and by-pass valve and is determined in the engine mapping process, and the calibration offset CAL_Offset_A is selected to lower the value of the maximum achievable intake manifold pressure with a fully opened bypass valve $MAP_{MAX\_THR\_ONLY}$ to ensure that there will never be a time at which both the throttle 22 and bypass valve 32 are fully open or closed at the same time.

If at step 102, it is determined that $MAP_{des} < (MAP_{MAX\_THR\_ONLY} - CAL\_Offset\_A)$, then the method continues at step 104. Otherwise, the method continues at step 106. At step 104, the bypass valve 32 is set to fully open and manifold absolute pressure (MAP) is controlled to meet the desired intake manifold pressure $MAP_{des}$ by adjusting only the throttle 22 position based on the sensed intake manifold pressure. The method 100 is completed at this point.

At step 106, it is determined whether the maximum achievable intake manifold pressure with a fully opened bypass valve ($MAP_{MAX\_THR\_ONLY}$) minus the calibration offset (CAL_Offset_A) ($MAP_{MAX\_THR\_ONLY} - CAL\_Offset\_A$) is less than or equal to the desired intake manifold pressure ($MAP_{des}$) that is less than the maximum achievable intake manifold pressure with a fully opened bypass valve ($MAP_{MAX\_THR\_ONLY}$). If so, the method 100 continues at step 108 where the throttle position is set to (100–TBL($MAP_{MAX\_THR\_ONLY} - MAP_{des}$)) percent of the fully open position; where the table TBL($MAP_{MAX\_THR\_ONLY} - MAP_{des}$) is a calibration table indexed by manifold air pressure and set up such that as $MAP_{des}$ gets closer to $MAP_{MAX\_THR\_ONLY}$, the value from the table should be closer to zero (i.e., little to no percentage reduction from the fully open, 100% position). The manifold absolute pressure (MAP) is controlled to meet the desired intake manifold pressure $MAP_{des}$ by adjusting only the bypass valve 32 position based on the sensed intake manifold pressure. The method 100 is completed at this point.

If there is a no answer at step 106, the method 100 continues at step 110 where the throttle 22 position is set to fully open and the manifold absolute pressure (MAP) is controlled to meet the desired intake manifold pressure MAP des by adjusting only the bypass valve 32 position based on the sensed intake manifold pressure. The method 100 is completed at this point. As such, the method 100 minimizes the supercharger's bypass valve 32 closing and maximizes the system's 10 fuel efficiency in a closed loop manner.

Figure 3:
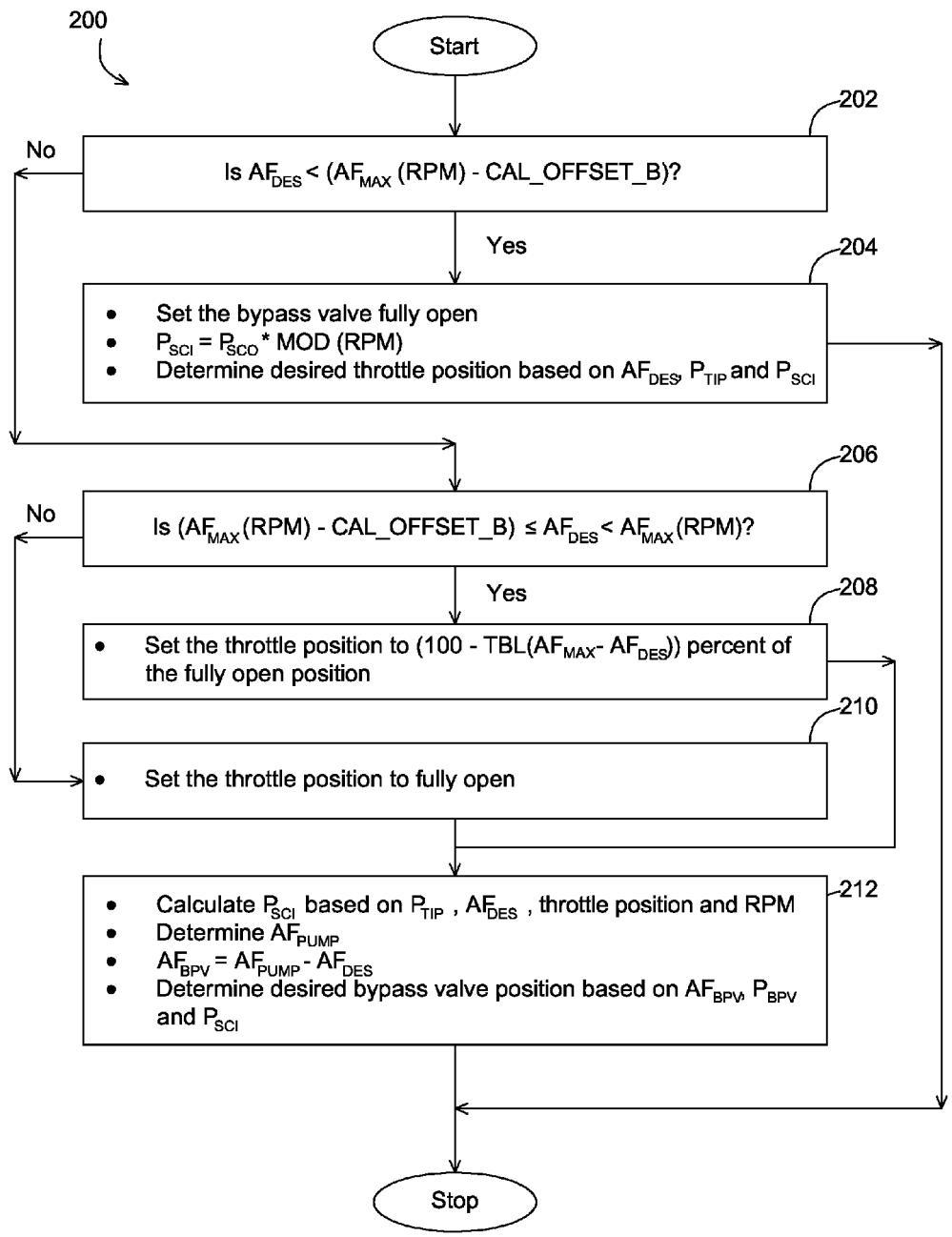
FIG. 3 illustrates a flowchart of another example method for controlling an electronic throttle and a supercharger bypass valve used in the FIG. 1 system.

FIG. 3 illustrates another example method 200 for controlling the electronic throttle 22 and a supercharger bypass valve 32 used in the FIG. 1 system 10. In a desired embodiment, the method 200 is implemented in software, stored in a computer readable medium, which could be a random access memory (RAM) device, non-volatile random access memory (NVRAM) device, or a read-only memory (ROM) device) and executed by the ECU 40. The method 200 can be performed continuously or periodically as part of background or normal processing of the ECU 40.

The method 200 schedules the right throttle 22 position and bypass valve 32 position in a coordinated open loop fashion to ensure that the correct amount of inlet air flow is delivered to intake manifold to meet the desired manifold pressure MAP des target. Although not shown as a separate step, the method 200 initially determines and uses the target $MAP_{des}$ (calculated using equation (1) discussed above). Considering the effects of the air cooler 24, the method 100 also determines the pressure before the cooler, i.e., air pressure $P_{SCO}$ at the output of the supercharger 30, as follows:

$$P_{SCO} = MAP_{des} * TBL(T_{manifold} / T_{SCO}) \quad (3)$$

Where the table of parameters TBL($T_{manifold}/T_{SCO}$) can be determined in engine mapping process.

At step 202, the method 200 compares the maximum inlet air flow with a fully opened throttle and a fully opened bypass valve ($AF_{MAX}$) to the desired inlet air flow ($AF_{DES}$). $AF_{MAX}$ is a primary function of engine speed (RPM) and is determined through the engine mapping process. Let's denote it as $AF_{MAX}$(RPM). The desired inlet air flow $AF_{DES}$ is determined by the desired engine torque. Specifically, step 202 determines if $AF_{DES} < (AF_{MAX}(RPM) - CAL\_OFFSET\_B)$. CAL_OFFSET_B is a calibration variable selected to lower the value of the maximum air flow to ensure that there will never be a time at which both the throttle 22 and bypass valve 32 are fully open or closed at the same time. If the desired inlet air flow $AF_{DES}$ satisfies the condition at step 202, the method continues at step 204 where the bypass valve 32 is set to the fully open position. In addition, the air pressure $P_{SCI}$ at the input of the supercharger 30 is determined as shown below and used, along with $AF_{DES}$ and $P_{TIP}$, to determine the desired throttle position (using known fluid flow through restrictions). At the completion of step 204, the method 200 is completed.

If, however, the desired air flow $AF_{DES}$ does not meet the conditions at step 202, the method 200 continues at step 206 where it is determined if $(AF_{MAX}(RPM)-CAL\_OFFSET\_B)$ is less than or equal to a desired air flow $AF_{DES}$ that is less than the $AF_{MAX}(RPM)$. If so, at step 208, the throttle position is set to $(100-TBL(AF_{MAX}-AF_{DES}))$ percent of the fully open position. $TBL(AF_{MAX}-AF_{DES})$ is a calibration table indexed by air flow and set up such that as the max air flow $AF_{MAX}$ gets closer to $AF_{DES}$, its values should be closer to zero (i.e., little to no percentage reduction from the fully open, 100% position). The method 200 then continues at step 212 (discussed below).

If, however, it is determined that the $(AF_{MAX}(RPM)-CAL\_OFFSET\_B)$ does not satisfy the conditions at step 206, the method continues at step 210 where the throttle 22 is set to the fully open position. At step 212, whether performed after step 208 or 210, the method 200 calculates the air pressure $P_{SCI}$ at the input of the supercharger 30 based on the $P_{TIP}$, $AF_{DES}$, the throttle position, and the engine speed. The amount of air flowing through the supercharger pump $AF_{PUMP}$ is then determined as a function of the air pressure $P_{SCI}$ at the input of the supercharger 30 and the engine speed (based on the engine mapping process). The amount of air flowing through the supercharger bypass valve 32 $AF_{BPV}$ is then determined by:

$$AF_{BPV}=AF_{PUMP}-AF_{DES} \quad (4)$$

Moreover, at step 212, the bypass valve 32 position will be determined based on the air flowing through the supercharger bypass valve 32 $AF_{BPV}$, air pressure $P_{SCI}$ at the input of the supercharger 30 and the air pressure $P_{SCO}$ at the output of the supercharger 30. The method 200 is completed at this point and has achieved the goal of minimizing the bypass valve 32 closing while maximizing the system efficiency. In addition, or alternatively, since both the electronic throttle 22 and supercharger bypass valve 32 positions are determined in an open loop manner, an adaption scheme may be necessary to compensate for hardware variations and components aging. This can be achieved by comparing the target pressure values at various locations with actual sensed signals (via pressure sensors) and by modifying certain calibration tables/surfaces from these differences. The adaption process may be slow and may only be enabled under certain stable conditions.

What is claimed is:

1. A method of controlling an engine system comprising a throttle, a manifold absolute pressure (MAP) sensor, a supercharger, a supercharger bypass valve connected between an intake manifold and the throttle, and a controller, the method comprising:
    determining a desired manifold pressure by the controller;
    detecting a sensed manifold pressure via the MAP sensor;
    fully opening the supercharger bypass valve and controlling the throttle based on the sensed manifold pressure when the desired manifold pressure is less than a first pressure threshold;
    controlling the throttle to a position based on the desired manifold pressure and a second pressure threshold and controlling the supercharger bypass valve based on the sensed manifold pressure when the desired manifold pressure is between the first pressure threshold and the second pressure threshold, wherein the second pressure threshold is greater than the first pressure threshold; and
    fully opening the throttle and controlling the supercharger bypass valve based on the sensed manifold pressure when the desired manifold pressure is greater than the second pressure threshold.

2. The method of claim 1, wherein the second pressure threshold is a maximum achievable manifold pressure by fully opening the supercharger bypass valve.

3. The method of claim 2, wherein the first pressure threshold is the maximum achievable manifold pressure by fully opening the supercharger bypass valve offset by a calibration variable.

4. The method of claim 3, wherein the calibration variable has a magnitude to ensure that the throttle and the supercharger bypass valve are never simultaneously fully-open or fully-closed.

5. An engine system of a vehicle, the system comprising:
    a throttle connected to an intake manifold connected to an engine;
    a manifold absolute pressure (MAP) sensor;
    a supercharger and a supercharger bypass valve connected between the intake manifold and the throttle; and
    a controller connected to the throttle and the supercharger bypass valve and comprising a non-transitory memory having a set of instructions stored thereon that, when executed by the controller, causes the controller to:
        determine a desired manifold pressure;
        detect a sensed manifold pressure via the MAP sensor;
        fully open the supercharger bypass and control the throttle based on the sensed manifold pressure when the desired manifold pressure is less than a first pressure threshold;
        control the throttle based on the desired manifold pressure and a second pressure threshold and control the supercharger bypass valve based on the sensed manifold pressure when the desired manifold pressure is between the first pressure threshold and a second pressure threshold, wherein the second pressure threshold is greater than the first pressure threshold; and
        fully open the throttle and control the supercharger bypass valve based on the sensed manifold pressure when the desired manifold pressure is greater than the second pressure threshold.

6. The system of claim 5, wherein the second pressure threshold is a maximum achievable manifold pressure by fully opening the supercharger bypass valve.

7. The system of claim 6, wherein the first pressure threshold is a maximum achievable manifold pressure by fully opening the supercharger bypass valve offset by a calibration.

8. The system of claim 7, wherein the calibration variable has a magnitude to ensure that the throttle and the supercharger bypass valve are never simultaneously fully-open or fully-closed.

9. A system for an engine having an intake manifold that receives air received via an inlet and a supercharger connected between the inlet and the intake manifold, the system comprising:
    a throttle valve connected between the supercharger and the inlet;
    a supercharger bypass valve connected between the throttle and the intake manifold and configured to divert airflow thereby bypassing the supercharger; and a controller comprising a non-transitory memory having a set of instructions stored thereon that, when executed by the controller, causes the controller to perform operations comprising:
  determining a desired airflow from the inlet into the intake manifold;
  detecting a first sensed pressure at an input of the throttle valve via a first pressure sensor,
  detecting a second sensed pressure at an input of the supercharger via a second pressure sensor, and
  detecting a third sensed pressure at an output of the supercharger via a third pressure sensor;
  fully opening the supercharger bypass valve and controlling the throttle valve based on the desired airflow and the first and second sensed pressures when the desired airflow is less than a first threshold;
  controlling the throttle based on the desired airflow and a second threshold and control the supercharger bypass valve based on the desired airflow when the desired airflow is between the first threshold and the second threshold, wherein the second threshold is greater than the first threshold; and
  fully opening the throttle and controlling the supercharger bypass valve based on the desired airflow when the desired airflow is greater than the second threshold.

10. The system of claim 9, wherein when the desired airflow is less than a first threshold, the second pressure is obtained by adjusting the third pressure by a speed of the engine.

11. The system of claim 9, wherein when the desired airflow is between the first and second thresholds or greater than the second threshold, the second pressure is obtained based on the first pressure, the desired airflow, a position of the throttle, and a speed of the engine.

12. The system of claim 11, wherein the operations further comprise:
  determining an airflow through the supercharger;
  determining a supercharger bypass valve airflow based on a difference between the supercharger airflow and the desired airflow; and
  determining a supercharger bypass valve pressure drop based on a difference between the second and third pressures,
  wherein when the desired airflow is between the first and second thresholds or greater than the second threshold, the supercharger bypass valve is controlled based on the supercharger bypass valve airflow, the supercharger bypass valve pressure drop, and the second pressure.

* * * * *